Figure 1:
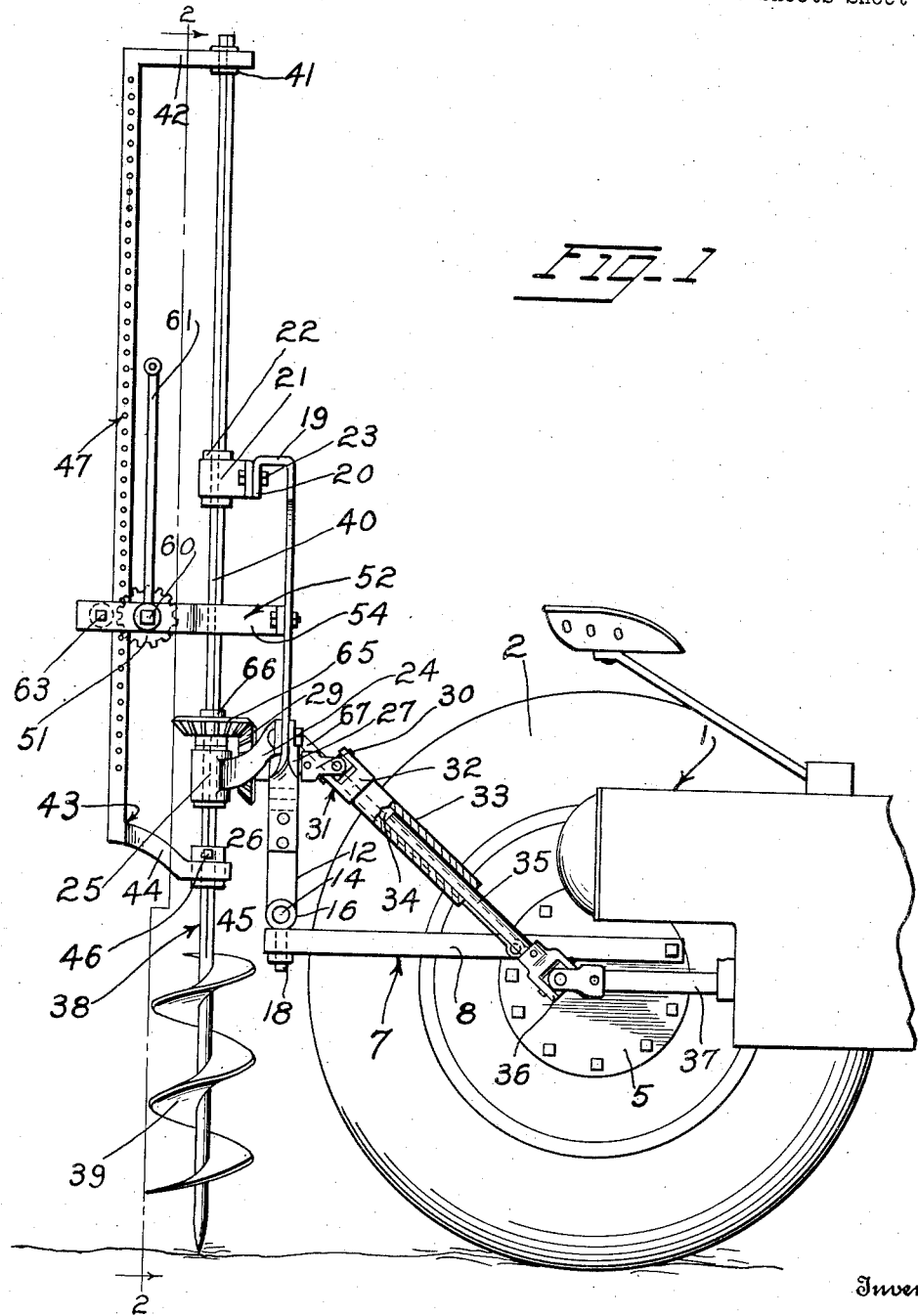

April 22, 1941.  E. J. VANCE  2,239,024
POSTHOLE DIGGER
Filed May 26, 1939  3 Sheets-Sheet 1

Inventor
E. J. Vance.
By Lacey & Lacey, Attorneys

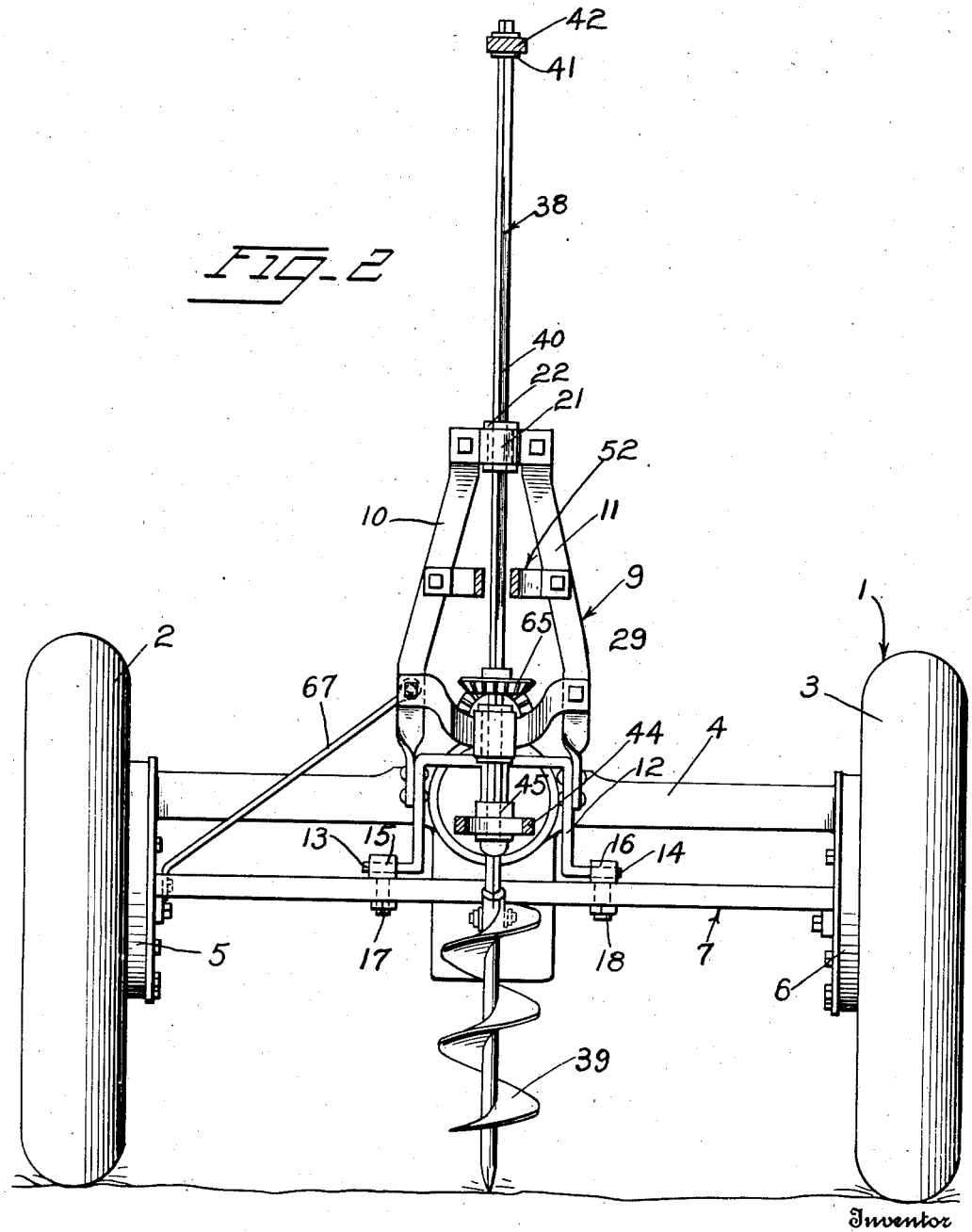

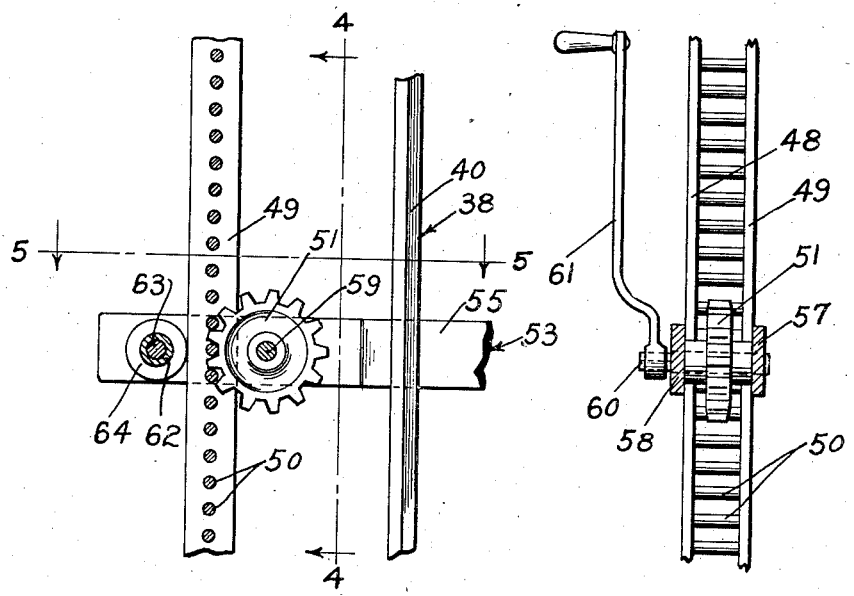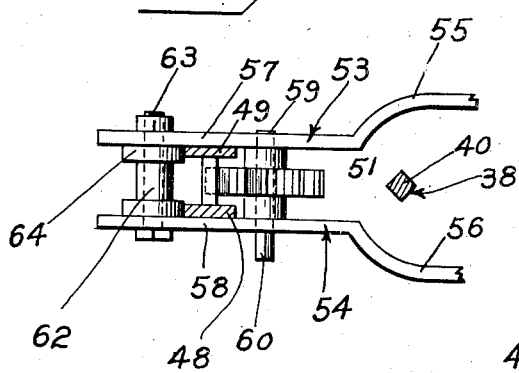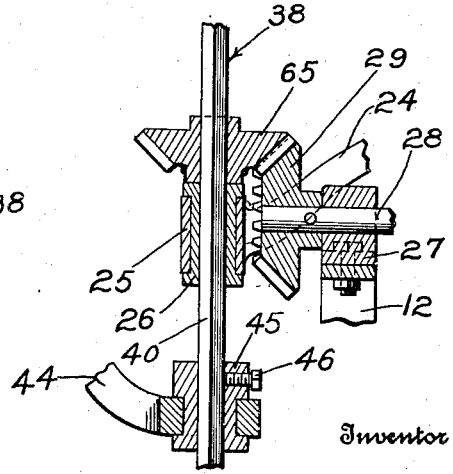

Patented Apr. 22, 1941

2,239,024

UNITED STATES PATENT OFFICE 2,239,024

POSTHOLE DIGGER

Edward J. Vance, De Witt, Iowa

Application May 26, 1939, Serial No. 275,983

1 Claim. (Cl. 255—22)

This invention relates to an improved posthole digger and has, for one of its objects, to provide a machine of this character which will effectually excavate postholes and which may be readily attached to and detached from a conventional farm tractor.

Another object of the invention is to provide a posthole digger which is adjustable so that postholes of various depths may be dug.

A further object of the invention is to provide a posthole digger which will be driven from the power take-off of the tractor.

Other objects of the invention not mentioned hereinbefore will become apparent as the description proceeds.

My invention is illustrated in the accompanying drawings, wherein:

Figure 1 is a side elevation, partly in section, of my improved posthole digger, Figure 2 is a vertical sectional view on the line 2—2 of Figure 1, Figure 3 is an enlarged detail sectional view showing a portion of the raising and lowering mechanism, Figure 4 is a vertical sectional view on the line 4—4 of Figure 3, Figure 5 is a transverse sectional view on the line 5—5 of Figure 3, and Figure 6 is an enlarged detail vertical sectional view of the drafting mechanism employed.

Referring now to the drawings wherein like numerals of reference will be seen to designate like parts throughout the views, the numeral 1 indicates in general a tractor which is of the type commonly employed by farmers and the like. The tractor 1 includes wheels 2 and 3 which are connected by an axle housing 4, which is connected at its free ends to driving hubs 5 and 6. In order to provide a mounting for my improved posthole digger, I provide a substantially U-shaped frame member 7 which has side portions 8 connected to the driving hubs 5 and 6. As will be seen in Figure 1, the portions 8 extend chordally with respect to the driving hubs with the result that the frame 7 will be rigidly mounted in position on the tractor. The frame member extends rearwardly to a point rearwardly of the wheels 2 and 3.

My improved posthole digger includes a supporting frame which is indicated in general by the numeral 9. The frame 9 includes side members 10 and 11 which are connected at their corresponding lower ends with the arms of the U-shaped supporting yoke 12. The supporting yoke has its corresponding lower end portions turned laterally to define trunnions 13 and 14 which are journaled in bearing sleeves 15 and 16. The bearing sleeves 15 and 16 are mounted in spaced relation on the rear bar of the frame 7 by means of bolts 17 and 18, respectively.

As best seeen in Figure 1, the side members 10 and 11 of the supporting frame 9 are bent outwardly at 19 and are bent downwardly at 20 to define a bearing guide mounting for a bearing guide 21. The bearing guide 21 is of substantially loop-shape and carries a guide sleeve 22 therein. Suitable bolts 23 connect the bearing guide 21 with the mounting 20 of the frame 9.

Carried on the frame 9 is a substantially U-shaped outwardly bowed gear supporting bracket 24. The gear supporting bracket 24 is mounted above the supporting yoke 12 and has its opposite ends bolted to the lower end portions of the side members 10 and 11. At its mid portion the bracket 24 has an integral vertically extending sleeve 25 which is vertically aligned with the mounting 21. The sleeve 25 has a guide member 26 therein. Mounted on the supporting yoke 12 medially of its bite portion is a bearing 27. The bearing 27 journals a stub shaft 28 to the free end of which is keyed a beveled driving gear 29. At its opposite end the stub shaft 28 carries a section 30 of a universal 31. The other section 32 of the universal 31 is mounted on a driving sleeve 33 which is provided with a squared opening 34 throughout the major portion of its length. Received in the squared opening 34 is a driving shaft 35 which is connected at its lower end with a universal 36. The opposite side of the universal 36 is connected with a power take-off shaft 37 which is connected with the tractor transmission. The cooperating sleeve 33 and driving shaft 35, as will be hereinafter set forth, provide an adjustable driving connection for my improved posthole digger. A clutch may be mounted on the stub shaft 28 and will serve the purpose of allowing automatic stopping of the machine when a large rock or the like is encountered.

In order to effect the actual digging of the postholes, I provide an auger 38. The auger 38 has a ground-engaging screw 39 and a relatively long squared shank 40. The squared shank extends through the member 26 and the sleeve 22 and extends well above said sleeve 22. At its upper end the shank 40 is mounted in an upper sleeve 41 which is rotatable in a guide arm 42 which forms part of a lifting frame 43. A lower guide arm 44 has a sleeve member 45 fitting about the shank 40 near its lower end. A set screw 46 locks the raising frame 43 to the shank 40 so that the frame and shank will be movable in unison. The frame 43 has a vertically extending rack 47 which extends substantially parallel to the shank 40. The rack, as best seen in Figures 3 and 4, includes side members 48 and 49 which are connected by a plurality of equally vertically spaced studs 50 which, of course, define rack teeth.

For shifting the frame 43, with the auger 38, I provide a lifting gear 51 which has teeth engageable in the teeth 50 of the rack 47. The gear 51 is supported by a lifting frame 52 which comprises side plates 53 and 54, said side plates being mounted at their inner corresponding ends, respectively, on the side members 10 and 11 of the supporting frame 9. As best seen in Figure 5, the side plates 53 and 54 are provided with bowed portions 55 and 56, which extend about the shank 40, and parallel portions 57 and 58 between which is mounted the gear 51. The gear 51 has a mounting shaft 59 with a squared outer portion 60. Connecting with the portion 60 is a crank 61, rotation of which will, of course, effect rotation of the gear 51, with consequent raising or lowering of the frame 43 and auger 38. Outwardly of the gear 51 and the rack 47 between the sections 57 and 58, there is also a roller 62. The roller 62 is rotatably mounted on a bolt 63 which extends through the outer end portions of the sections 57 and 58 and has treads 64 which bear against the sides 48 and 49 of the rack 47. The roller 62 thus operates to keep the rack 47 in proper operative relationship with the gear 51 so that raising and lowering of the frame 43 by the crank 61 will always be possible.

Mounted on the shank 40 of the auger 38 is a driven beveled gear 65 which has a squared sleeve 66 receiving slidably therethrough the squared shank so that said driven beveled gear will permit vertical sliding movement of the auger 38 and yet, at the same time, will prevent rotation of said gear 65 with respect to the shank 40. The beveled gear 65 will mesh with the beveled driving gear 29 at all times and will be driven thereby. As best seen in Figure 6 of the drawings, the gear 65 rests upon the upper face of the member 28.

In order to retain the machine in a given set position, I provide a bracing rod 67 which is connected between the driving hub 5 and a portion of the guide member 10 of the supporting frame 9.

It is believed that the operation of the machine will be understood from the foregoing description. However, a brief summary is not thought to be out of place.

After the machine has been attached to a tractor, as heretofore described, and the tractor is moved to a position for a posthole digging operation, the power is transmitted to the driving shaft 35 and sleeve 33 and thence to the gears 29 and 65. Rotation of the auger 38 will take place and, when the crank 61 is moved for lowering the frame 43 and auger 38, an earth-boring operation will take place. The crank 61 may be rotated for lowering the frame and auger to such an extent that a posthole of the desired depth may be dug. Rotation of the crank 61 in an opposite direction will, of course, effect raising of the auger 38 from the ground. After this is done, the tractor may, of course, be moved to the next position.

It will be understood that the entire machine may be swung to various angles with respect to the ground. The machine is swung on the trunnions 13 and 14, in the bearings 15 and 16. The swinging movement is, furthermore, permitted by the telescoping driving shaft 35 and sleeve 33. The rod 67 will, of course, be adjustable for permitting such changes in position of the machine with respect to the tractor.

It is particularly desired to call attention to the fact that the machine may be readily attached to and detached from an ordinary farm tractor. It is further desired to state that the machine is simple in construction and capable of manufacture at reasonable cost. Further description is believed unnecessary.

Having thus described the invention, what is claimed as new is:

In a posthole digger, a supporting frame having side members, a guide mounting carried by the supporting frame at the upper end of said side members, a mounting sleeve in said guide mounting, a gear supporting bracket carried by the side members and having a sleeve, a guide member in the sleeve and in vertical alignment with the first-mentioned sleeve, a supporting yoke on the frame and having trunnions, a frame member connected to a tractor, bearings carried by the frame member and journaling the trunnions, a bearing carried by the supporting yoke, a stub shaft rotatable in the bearing, a beveled driving gear carried by the stub shaft, a universal, a drive sleeve connected to the universal, said universal also being connected to the stub shaft, a drive shaft in the sleeve, means connecting the drive shaft with a power take-off, an auger having an earth-engaging screw and a shank, said shank being slidable through the guide member and sleeve, a lifting frame carried by the shank and having a rack, a lifting gear, a lifting frame mounting the gear for engagement with the rack, said lifting frame being carried by the supporting frame, and a crank carried by the lifting gear and being engageable for shifting the lifting frame and auger for effecting a posthole digging operation.

EDWARD J. VANCE.